United States Patent [19]

Miyagawa

[11] 4,074,025
[45] Feb. 14, 1978

[54] INDICATING DEVICE FOR STORAGE BATTERY

[75] Inventor: Shiro Miyagawa, Suita, Japan

[73] Assignee: Miyagawa Kasei Industry Co., Ltd., Osaka, Japan

[21] Appl. No.: 778,364

[22] Filed: Mar. 17, 1977

[30] Foreign Application Priority Data

| Mar. 29, 1976 | Japan | 51-38766[U] |
| Mar. 29, 1976 | Japan | 51-38767[U] |
| Mar. 29, 1976 | Japan | 51-38768[U] |
| Mar. 31, 1976 | Japan | 51-40621[U] |
| July 23, 1976 | Japan | 51-98893[U] |
| Jan. 6, 1977 | Japan | 52-901[U] |

[51] Int. Cl.$^2$ .................................. H01M 1/06
[52] U.S. Cl. ................................. 429/91; 73/454
[58] Field of Search ............ 429/91; 73/317, 327, 73/32 R, 440, 451-454

[56] References Cited

U.S. PATENT DOCUMENTS

| 3,340,736 | 9/1967 | Suematsu | 429/91 |
| 3,915,753 | 10/1975 | Melone | 429/91 |

Primary Examiner—John H. Mack
Assistant Examiner—H. A. Feeley
Attorney, Agent, or Firm—W. G. Fasse; W. W. Roberts

[57] ABSTRACT

An indicating device for a storage battery comprising: a bar-like body which is transparent, inserted through and held on the upper wall of the electrolytic vessel of a storage battery, has a pointed lower end and is immersed in the electrolyte in the storage battery; and an indicating member which is disposed in the electrolyte near the lower end of the bar-like body, rotatable around a horizontal axis, has its specific gravity correlated with that of the electrolyte and has its center of buoyancy deviated from the rotative axis thereof so that the indicating member is rotated as it sinks and floats according as the specific gravity of the electrolyte varies, the arrangement being such that when the indicating member is seen through the transparent bar-like body from above the storage battery, the indicating member, for example, selectively moves into and out of a visible range so that the manner of indication is changed according to the specific gravity of the electrolyte.

35 Claims, 42 Drawing Figures

INDICATING DEVICE FOR STORAGE BATTERY

BACKGROUND OF THE INVENTION

1. Field of the Invention

The present invention relates to an indicating device for a storage battery and more particularly it related to an indicating device for indicating concentration which is installed in order to monitor the concentration of the electrolyte in a storage battery.

2. Description of the Prior Art

The amount of electrolyte in a storage battery should be kept constant. More particularly, too large an amount causes leakage, while, conversely, too small an amount results in the active substances of the electrode plates being changed into lead sulfate in the case of a lead storage battery, thus stopping the function of the storage battery. Further, even if the amount is proper, it is impossible to improve the performance of the storage battery unless the concentration (or specific gravity) of the liquid is proper.

In order to indicate the amount of electrolyte, it has been a usual practice to prepare a transparent bar-like (or pipe-like) body of methacrylic resin or styrol resin, with one end thereof pointed and inserted in the electrolyte and the other end exposed to the cover of the storage battery. This makes use of the optical property of the bar-like body such that when the pointed end of the bar-like body does not reach the electrolyte surface the bar-like body will shine white owing to total reflection as it receives the light from outside the storage battery but when it is immersed in the electrolyte, total reflection is prevented only over the immersed portion while the light-shielded interior of the electrolytic vessel is seen through and looks dark. More particularly, the dark-looking portion changes with cross-sectional shape of the bar-like body on the level of the electrolyte surface. Therefore, when the amount of electrolyte is too small, the entire area looks white, while as said amount increases, the area of the dark-looking region increases until the entire area looks dark.

On the other hand, in order to indicate the concentration of the electrolyte, it is expressed in terms of specific gravity. Therefore, specific gravity or concentration is determined by sinking and floating of a member having a predetermined specific gravity (e.g. a gravimeter).

The specific gravity of the electrolyte is correlated with the voltage of the storage battery and it has heretofore been practiced to measure the specific gravity in order to monitor the discharging and charging of the storage battery. Thus, the measurement of specific gravity is significant in order to detect over charging and completion of charging of the storage battery.

SUMMARY OF THE INVENTION

The present invention provides an indicating device for a storage battery which is adapted to be installed on a storage battery and capable of securely indicating the concentration of the storage battery.

The indicating device of the invention includes means through which the electrolyte is seen from outside the storage battery. This seeing-through means is, for example, in the form of a bar-like body of a transparent material adapted to be held on the upper wall of a storage battery as it extends therethrough. In this connection, the upper end surface of the bar-like body is exposed to the upper wall of the electrolytic vessel and the lower end portion is immersed in the electrolyte. When the bar-like body is observed from above, a range which is defined by the cross-sectional shape of the bar-like body and which is in the electrolyte in which the bar-like body is immersed, can be viewed. The indicating means is provided in association with such visible range. The indicating means is, for example, located in the electrolyte below the bar-like body and rotatable around a horizontal axis, the specific gravity thereof being correlated with that of the electrolyte. Further, the center of the buoyancy which the indicating means receives in the electrolyte is at a position deviated from the axis of rotation thereof so that it is rotated by sinking and floating thereof due to changes in the specific gravity of the electrolyte. According to this rotation, the manner of indication which can be seen through the seeing-through means is changes. More particularly, the indicating means is selectively moved into and out of a range which can be viewed through, for example, the seeing-through means and one of its differently colored surfaces is turned toward the seeing-through means, thereby changing the manner of visible indication. Such manner of indication is correlated with the specific gravity, or concentration, of the electrolyte.

Accordingly, a principal object of the invention is to provide an indicating device for a storage battery wherein the concentration is perceived in terms of specific gravity, whereby the condition of the concentration can be viewed easily and hence without error.

Another object of the invention is to provide an indicating device for a storage battery whose construction is simple and compact to allow advantageous installation thereof and which is inexpensive.

A further object of the invention is to provide an indicating device which is capable of clearly reporting the condition of overdischarging, or the condition which requires charging of the storage battery.

Still a further object of the invention is to provide an indicating device for a storage battery which is capable of clearly reporting the condition of completion of charging of the storage batter.

Another object of the invention is to provide an indicating device for a storage battery which is capable of stepwise indicating the concentration of the electrolyte.

Another object of the invention is to provide an indicating device for a storage battery which is capable of stepwise indicating the overdischarged condition, the safely dischargeable condition and the completion of charging of the storage battery.

Another object of the invention is to provide an indicating device for a storage battery which is capable of indicating the concentration of the electrolyte and whether the level of the electrolyte is proper or not at the same time.

These objects and other object and features of the invention will become more apparent from the following detailed description given with reference to the accompanying drawings.

BRIEF DESCRIPTION OF THE DRAWINGS

FIGS. 1 and 2 are views of a storage battery to which an indicating device according to the present invention is advantageously applicable, wherein

FIGS. 14 and 15 show only the principal portion of a modification of the first typical embodiment, wherein

FIGS. 22 through 24 show a modification of the second typical embodiment, wherein

DESCRIPTION OF THE PREFERRED EMBODIMENTS

Figure 1:
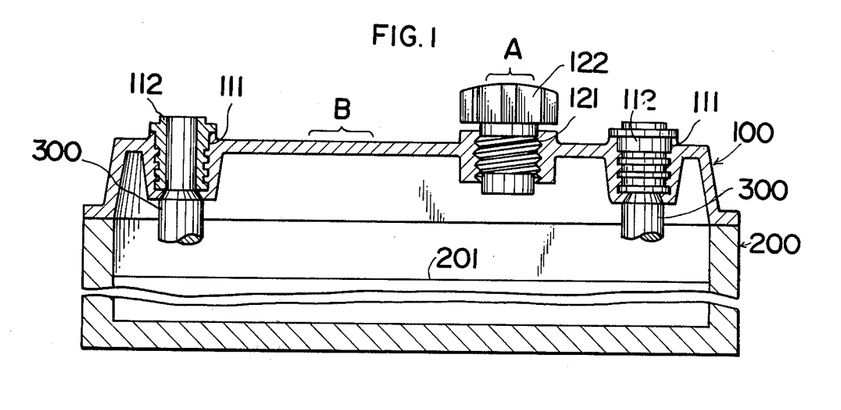
FIG. 1 is a sectional view taken along the line I—I of FIG. 2.
Figure 2:
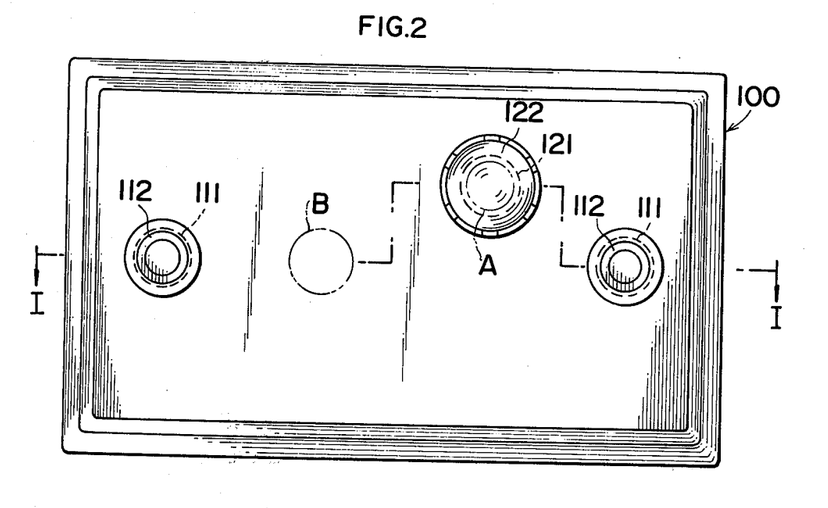
FIG. 2 is a plan view.

FIGS. 1 and 2 illustrate a storage battery to which the present invention is advantageously applicable. FIG. 1 is a sectional view taken along the line I—I of FIG. 2, and FIG. 2 is a plan view.

Referring to FIGS. 1 and 2, a cover 100 of a storage battery is secured to the body of the storage battery by thermal adhesion or other suitable method to constitute an electrolytic vessel of the storage battery. Two through-holes 111 are formed in the cover 100 for receiving rods 300 connected to electrode plates (not shown) and suitable sealing members 112 are fitted in the through-holes to keep the rods 300 liquid-tight. The end portions of the rods 300 form the electrical terminals of the storage battery. Further, an electrolyte port 121 is formed in the cover 100 for supplying electrolyte (or water). The port is normally closed by an electrolyte port plug 122. Further, the electrolyte port plug 122 is provided with a vent hole (not shown) to allow the gas to escape which is produced during discharging. The storage battery is filled with an electrolyte to a predetermined level 201. The indicating device of the present invention is installed, for example, in a portion A of the electrolyte port plug 122 or in a portion B of the cover 100. The embodiments to be described below may be divided typically into two types.

Figure 3:
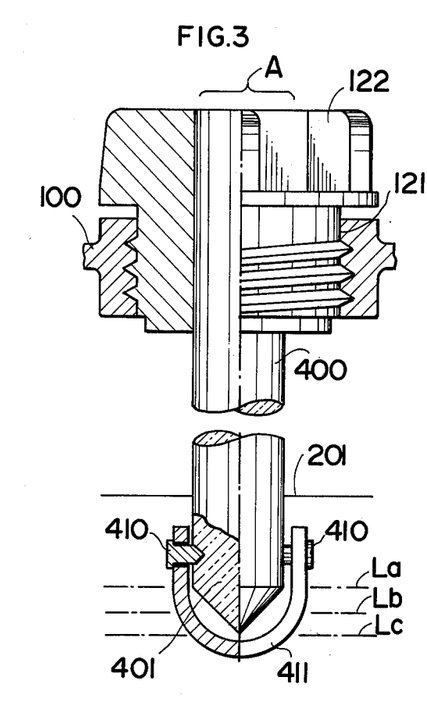
FIG. 3 is a partly sectional front view of an indicating device according to a first typical embodiment installed in a portion A of an electrolyte port 122.
Figure 4:
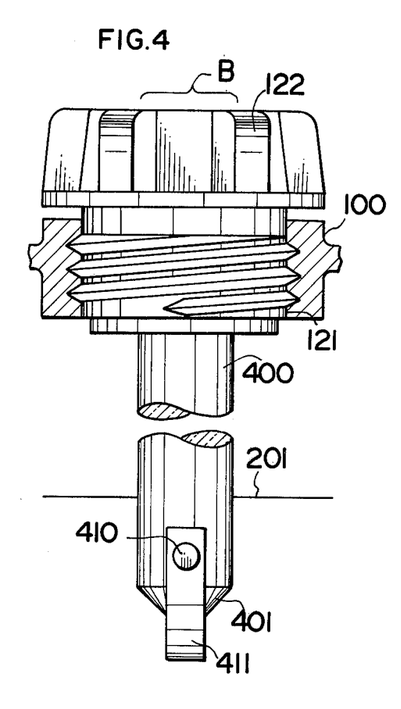
FIG. 4 is a side view of the same.

FIG. 3 is a partly sectional front view wherein an indicating device according to a first typical embodiment of the invention is installed in the portion A of the electrolyte port plug 122, and FIG. 4 is a side view of the same. Referring to FIGS. 3 and 4, a transparent bar-like body 400 made of methacrylic resin or styrol resin is inserted in the electrolyte port plug 122 to lie on the central axis thereof and is liquid-tightly fixed to the electrolyte port plug 122. The upper end surface of the bar-like body 400 is exposed to the upper surface of the electrolyte port plug 122 while the lower end portion forms a pointed end portion 401. With the arrangement described so far, it is possible to indicate the amount of electrolyte.

Figure 5:
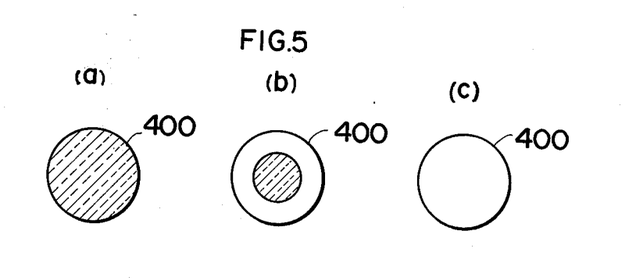
FIG. 5, (a), (b) and (c), illustrates the manners of indication which differ according to the amount of liquid.

FIG. 5, (a), (b) and (c), illustrates manners of indication which differ according to the amount of electrolyte. FIG. 5 illustrates the upper end surface of the bar-like body 400 as seen from above the storage battery. Referring to FIGS. 3 and 5, typically three manners of indication are realized. First, when the level of the electrolyte is above a level La the condition shown in FIG. 5, (a), is indicated. When it is below a level Lc, a condition shown in FIG. 5, (c), is indicated. When it lies between the levels La and Lc, a condition intermediate between FIG. 5, (a), and FIG. 5 (c), is indicated. For example, when the liquid level is at Lb, a condition shown in FIG. 5, (b), is indicated. The reason why the indication differs as described above is that when the light from the outside passes through the bar-like body 400, the medium which is in contact with the outer surface of the bar-like body 400 changes from time to time and hence the relative refractive index at the interface varies. More particularly, if the medium which is in contact with the bar-like body is air, total refraction takes place at the pointed end 401, but if it is an electrolyte, the relative interference index is increased to the extent that total refraction no longer takes place. Therefore, since the portion immersed in the electrolyte transmits light, the cross-sectional portion (or shaded portion) of the bar-like body 400 at which the level of the electrolyte is positioned transmits light, enabling the object therebelow to be seen through. In addition, when the condition shown in FIG. 5, (a), is established, that is, when the level of the electrolyte is above the level La (for example, when it is at the level 201), the amount of electrolyte is normal.

As described above, when the level of the electrolyte is normal, the object below the bar-like body 400 can be seen through from the upper end surface of the bar-like body 400. Therefore, a mechanism for indicating the specific gravity of the electrolyte will located at this position which allows seeing-through. Referring again to FIGS. 3 and 4, a pair of shaft members 410, 410 are fixed near the lower end of the bar-like body 400 which serves as seeing-through means. The pair of shaft members 410, 410 are opposed to each other with their axes aligned diametrically of the bar-like body 400. A U-shaped float 411 serving as indicating mean is pivotally mounted on said pair of shaft members 410, 410. The float 411 is selected such that its specific gravity is correlated with the specific gravity of the electrolyte. The specific gravity of the float 411 is determined on the basis of the specific gravity of the electrolyte.

Figure 6:
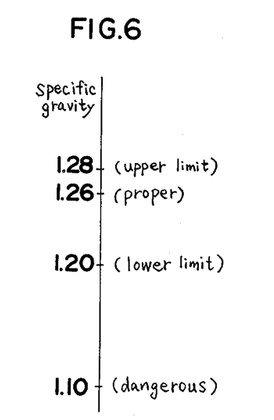
FIG. 6 is a graph showing the relation between the specific gravity of the electrolyte (at 20° C) contained in a certain type of storage battery and the condition of said storage battery.

FIG. 6 is a graph showing the relation between the specific gravity of the electrolyte (for example, at 20° C) contained in a certain type of storage battery (a lead storage battery), and the condition of the storage battery. Referring to FIG. 6, the proper scientific gravity is normally 1.26, but when it becomes 1.20 as a result of discharging, the storage battery must be charged. If it further decreases to below 1.10, this is dangerous. As for charging, it is preferable that the time of completion thereof be selected such that the specific gravity is about 1.28 which is higher than 1.26. In this manner, the condition of the electrolyte in the storage battery is perceived in terms of the specific gravity thereof, and it will be understood that the so-called allowable range has an upper limit (1.28) and a lower limit (1.20). In order to indicate the condition of specific gravity of the electrolyte, therefore, it is desirable to be able to give indications in such a manner as to identify the boundary between different values, for example, 1.28 and 1.20. For example, if the specific gravity of said float 411 is set at 1.20, it will be understood that the float will "float" when the specific gravity of the electrolyte become greater than 1.20 (see FIG. 7).

Figure 7:
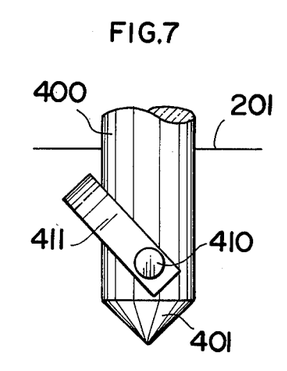
FIG. 7 is a side view connected with FIG. 3 and showing only the principal portion of a float 411 in floating condition.

FIG. 7 shows only the lower end of the bar-like body 400, wherein said float 411 is in a floating condition. If the float 411 has a specific gravity of, for example, 1.20, then the condition shown in FIG. 7 will be established when the specific gravity of the electrolyte becomes greater than 1.20. In the condition of FIG. 7, the float 411 abuts against the lateral surface of the bar-like body 400 and cannot be seen through the bar-like body 400, and whan can be seen through the bar-like body 400 is a region further below the bar-like body 400. In such condition, in an ordinary storage battery, since the electrolytic vessel is shielded from light, it looks dark.

In the embodiment described above, if the float 411 is colored, for example, red, then the red color is indicated in the condition of FIG. 3 while in the condition of FIG. 7 a dark color is indicated. Instead of indicating a dark color in the condition of FIG. 7, an indication of, for example, blue would be easier to understand. To this end, an arrangement shown in FIG. 8 may be contemplated.

Figure 8:
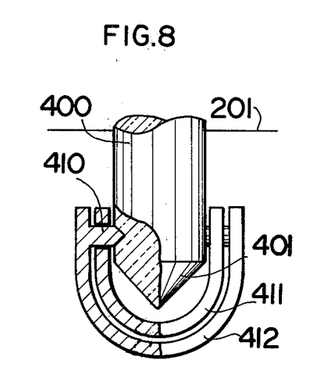
FIG. 8 is a partly sectional view showing only the lower end of a bar-like body 400 in another embodiment of the invention employing the first typical embodiment.

FIG. 8 shows another embodiment of the invention having the first typical embodiment applied thereto, showing only the lower end of the bar-like body 400. The shaft members 410 which pivotally supports the float 411 is fixedly provided with a U-shaped blue-colored member 412. The blue-colored member 412 is positioned outside the float 411 and can be selectively seen through when the float 411 is rotated. The condition shown in FIG. 8 is such that the float 411 is seen through. When the float 411 is floating as shown in FIG. 7, the colored member 412 is seen through. According to this embodiment, when the specific gravity of the electrolyte is greater than 1.20 (when it is proper), the blue color is indicated while it is less than 1.20 (when it is improper), the red color is indicated.

Figure 9:
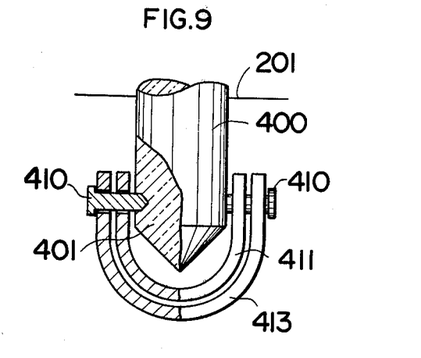
FIG. 9 is a partly sectional view showing only the lower end of a bar-like body 400 in a further embodiment of the invention employing the first typical embodiment.
Figure 10:
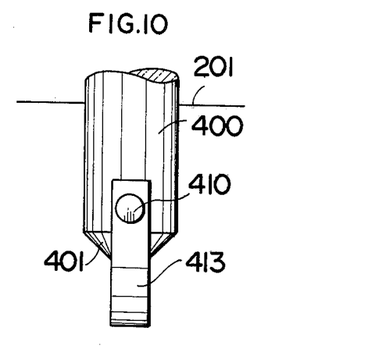
FIG. 10 is a side view of the same.

FIG. 9 shows a further embodiment of the invention having the first typical embodiment applied thereto and is a partly sectional front view showing only the lower end of the bar-like body 400, and FIG. 10 is a side view of the same. This embodiment is such that what corresponds to the colored member 412 shown in FIG. 8 is rotatably mounted. More particularly, a second float 413 is further provided which is rotatably mounted on the shaft members 410.

Figure 11:
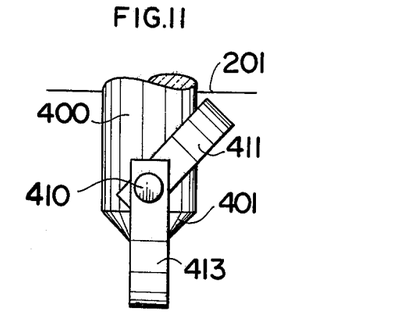
FIGS. 11 and 12 are side views showing different conditions established when the embodiment shown in FIG. 10 is followed.
Figure 12:
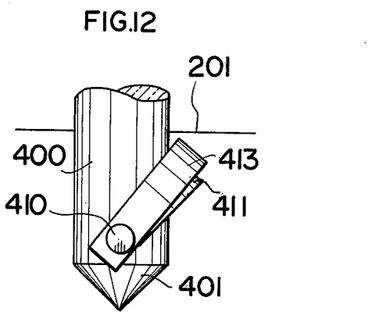

In the embodiment shown in FIGS. 9 and 10, if the first float 411 has a specific gravity of 1.20 and is colored red and the second float 413 has a specific gravity of 1.28 and is colored blue according to the relation shown in FIG. 6, then the following manner of indication is possible. FIGS. 11 and 12 are side views showing different conditions which can be established when the embodiment shown in FIG. 10 is adopted. Thus, FIGS. 10, 11 and 12 show conditions when the specific gravity of the electrolyte varies. First, when the specific gravity of the electrolyte is less than 1.20, the first and second floats 411 and 413 sink, providing the condition shown in FIG. 10 wherein the float 411 is seen through and hence the red color is indicated. Next, when the specific gravity of the electrolyte is between 1.20 and 1.28, the first float 411 floats to provide the condition shown in FIG. 11 wherein the second float 413 is seen through. Further, when the specific gravity of the electrolyte becomes greater than 1.28, the first and second floats 411 and 412 float so that the dark color in the electrolytic vessel which is shielded from light is indicated.

As in the case of FIG. 8 described above, in order that a red color may be indicated when the floats 411 and 413 are floating, a member corresponding to the member 412 (FIG. 8) fixed to the shaft members 410 may be provided and colored red.

In the embodiment shown in FIGS. 9 through 12, since two floats have been provided as described above, the condition of specific gravity of the electrolyte can be indicated stepwise. Accordingly, by suitably selecting particular values of specific gravity for the respective floats, for example as in the case of the above embodiment, it is possible to indicate any of the three conditions having boundaries of specific gravity at 1.28 and 1.20. Thus, the overdischarged condition (requiring changing) of the storage battery and the charging completion condition can be clearly reported. Further, other values of specific gravity may be selected as boundaries. For example, it is possible to use a specific gravity of 1.10 as a boundary. Further, in order to further increase the number of steps to be indicated, a larger number of floats may be employed and colored differently and placed one upon another for rotation.

Figure 13:
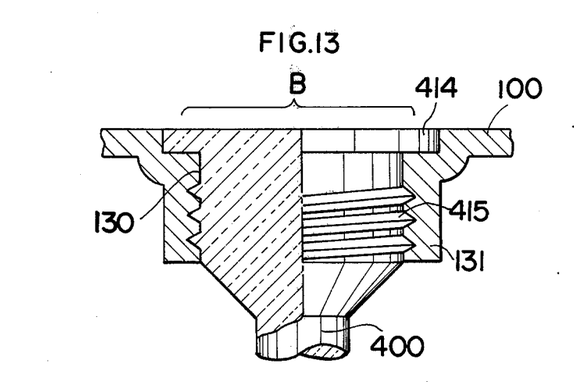
FIG. 13 is a partial sectional view for explanation of a case where the indicating device is installed in a portion B of a cover 100.

The indicating device described so far may be installed in the portion B of the cover 100 of the storage battery (FIGS. 1 and 2). FIG. 13 is a partly sectional view for explanation of a case where such indicating device is installed in the portion B of the cover 100. In FIG. 13, the lower end of the bar-like body 400 having a float 411 and the like is not shown. The head of the bar-like body 400 is formed with a disc-like end 414 and an externally threaded portion 415. They are formed integrally with the bar-like body 400. The head is greater in diameter than any other portions of the bar-like body 400. The cover 100 is provided with a through-hole 130 for receiving the head. The through-hole 130 is further defined by a cylindrical portion 131 extending below the lower surface of the cover 100. The wall surface which defines the through-hole has a shape correlated with said end 414 and externally threaded portion 415. In order to install the bar-like body 400 having the float 411 and the like attached thereto in the cover, the bar-like body 400 is inserted into the through-hole 130 from above and tightly screwed. In inserting the bar-like body 400, since the through-hole 130 has a relatively large diameter, advantageously there is no possibility of the float 411 and the like, which are attached to the bar-like body 400, forming an obstacle.

The embodiment in which the indicating device is directly installed in the cover 100 of the storage battery as shown in FIG. 13 is advantageously applied to a sealed type storage battery. What is called a sealed type storage battery is a storage battery of the type which does not need to be replenished with electrolyte (or water) as a task for maintenance of the storage battery and which, for this reason, is not provided with elements corresponding to the electrolyte port 121 and electrolyte port plug 122. A sealed type storage battery only needs charging as a task for maintenance and hence, advantageously, such maintenance can be fulfilled simply by properly checking the indicating device of the present invention.

As described above, the first typical embodiment of the invention includes at least one pivotally mounted float 411 serving as indicating means, such float 411 having its specific gravity set so that it sinks and floats in the electrolyte according to the specific gravity of the electrolyte, the sinking and floating of the float being converted into rotative motion. In connection with said float 411, there is provided a bar-like body 400 made of a transparent materal, the upper end surface of said bar-like body 400 being exposed to the upper surface of the storage battery, the lower end being immersed in the electrolyte. Therefore, if observed from the upper end surface of the bar-like body 400, a range which is defined by the cross-sectional shape of the bar-like body 400 on the lower end side thereof comes into the field of vision. On the other hand, the float 411 comes out of said field of vision as a result of the rotation of the float 411 caused by the floating thereof, so that the float 411 cannot be viewed from the upper end surface of the bar-like body 400. In the manner described above, the specific gravity of the electrolyte can be indicated as the float 411 selectively comes into and out of the field of vision.

A modification of the first typical embodiment will now be described.

Figure 14:
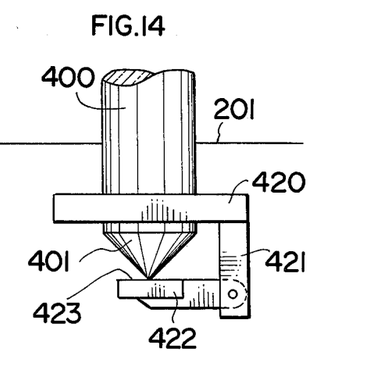
FIG. 14 is a front view and FIG. 15 is a side view.
Figure 15:
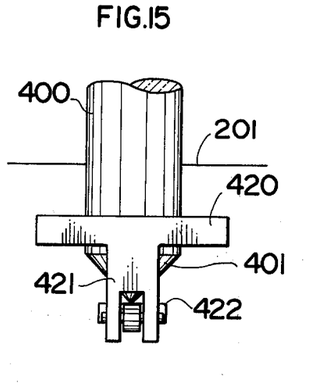

FIGS. 14 and 15 show much modification wherein only the lower end of a bar-like body 400 is shown. FIG. 14 is a front view and FIG. 15 is a side. Referring to FIGS. 14 and 15, a fixing member 420 is fixed near the lower end of the bar-like body 400 and a float 422 having one end thereof pivotally supported by a bearing 421 downwardly extending from the fixing member 420 is rotatable through a predetermined angle. The float 422 is selected such that its specific gravity is correlated with the specific gravity of the electrolyte, and a suitable portion 423 thereof is colored, for example, blue.

Figure 16:
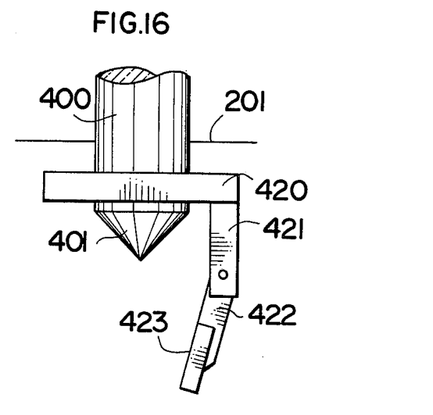
FIG. 16 is a front view connected with FIG. 14 and showing a float 422 in a sunken condition.

FIGS. 14 and 16 show a condition in which the float 422 is floating to abut against the lower end of the pointed end portion 81. The sunken condition of the float 422 is shown in FIG. 16. If the specific gravity of the float 422 is 1.20, then the condition of FIG. 16 is established when the specific gravity of the electrolyte becomes less than 1.20. In addition, as for the rotative range of the float 422, in order that the float may come back to the condition in which it abuts against the lower end of the pointed end portion 401 when the specific gravity of the electrolyte becomes greater than 1.20 again, the position shown in FIG. 16 is selected as one terminal position. In the condition shown in FIG. 16, the colored portion 423 cannot be viewed through the bar-like body 400, and what can be viewed through the bar-like body 400 is a region further below the float 422. In an ordinary storage battery, such region is a dark region inside the light-shielded electrolytic vessel of the storage battery.

Figure 17:
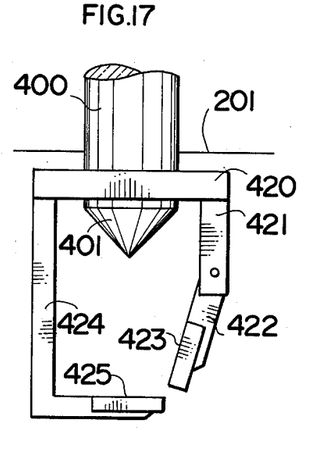
FIG. 17 is a front view showing the principal portion of an embodiment proposed in order to achieve an object similar to that of the embodiment shown in FIG. 8.

FIG. 17 shows an embodiment proposed in order to achieve an object similar to that of the embodiment shown in FIG. 8 described above. What differs from the embodiment shown in FIGS. 14 through 16 is that the end of an L-shaped member fixed to the fixing member 420 is provided with a member 425 colored, for example, red. This red-colored member 425 is fixed in position with respect to the bar-like body 400 and can be selectively seen through in accordance with the rotation of the float 422. The rest of the arrangement is similar to the embodiment shown in FIGS. 14 through 16, and like reference numerals are given to like parts and a description thereof is omitted. In addition, the condition shown in FIG. 17 is such that the colored member 425 can be viewed.

Figure 18:
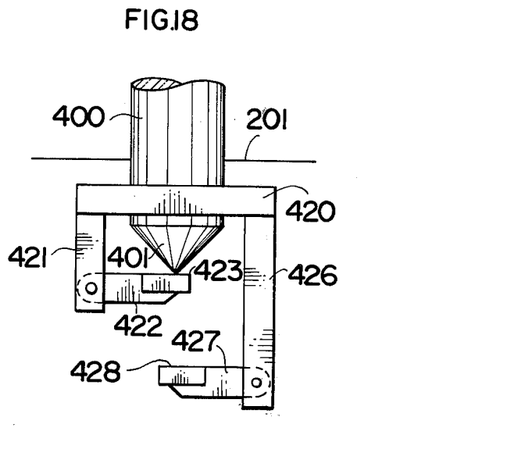
FIG. 18 is a front view showing the principal portion of an embodiment proposed to achieve an object similar to that of the embodiment shown in FIGS. 9 through 12.

FIG. 18 shows an embodiment proposed in order to achieve an object similar to that of the embodiment shown in FIGS. 9 through 12. What differs from the embodiment shown in FIGS. 14 through 6 is that two floats are provided on different levels. More particularly, a second float 427 having one end thereof pivotally mounted by a second bearing 426 downwardly extending from the fixed member is further provided. FIG. 18 shows a condition in which the first and second floats 422 and 427 are floating. The rotative range of the second float 427 is selected such that when it is floating, it assumes a horizontal position, while it sinks, though not shown it assumes a position such as the position of the float 422 shown in FIG. 16.

In the embodiment shown in FIG. 18, if the specific gravity of the first float 422 is set at, for example, 1.28 and that of the second float 427 at 1.20 and the colored regions 423 and 428 have different colors, then it is possible to indicate any of the three conditions having boundaries of specific gravity of electrolyte at 1.28 and 1.20.

As in the case of the embodiment shown in FIG. 17 as described above, an element corresponding to the colored member 425 may be added to the embodiment of FIG. 18 so that some particular color can be indicated when the two floats 422 and 427 are sunken. Further, in order to further increase the number of steps to be indicated, a larger number of rotatable floats may be provided on different levels. These floats will then be differently colored.

The feature of the modifications of the first typical embodiment described with reference to FIGS. 14 through 18 is that they are so arranged that the floats 422 and 427 come into the field of vision through the bar-like body at one terminal position of rotation caused by the floating thereof and come out of the field of vision at the other terminal position of rotation caused by the sinking thereof.

In addition, FIGS. 14 through 18 show only the lower end portion of the bar-like body 400 with the rest omitted from the illustration, but the position where it is installed may be at the portion A of the electrolyte port plug 122 or the portion B of the cover 100 (FIGS. 1 and 2). Further, as for the manner of installation, it may be similarly installed. The same may be said of the embodiments which will be described below.

Figure 19:
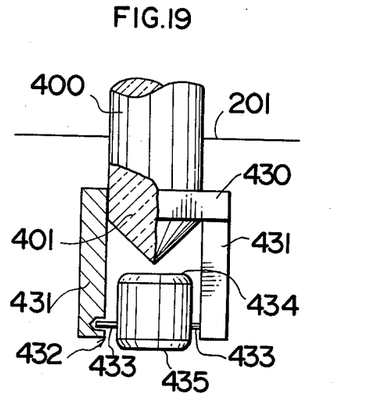
FIG. 19 is a partly sectional front view showing the principal portion of an indicating device according to a second typical embodiment of the invention.
Figure 20:
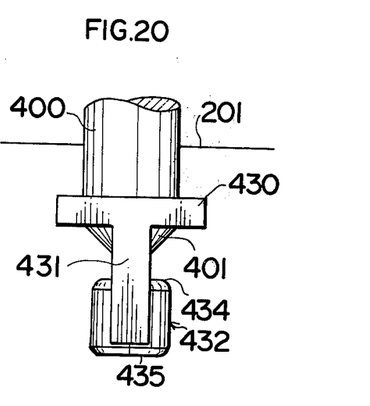
FIG. 20 is a side view of the same.
Figure 21:
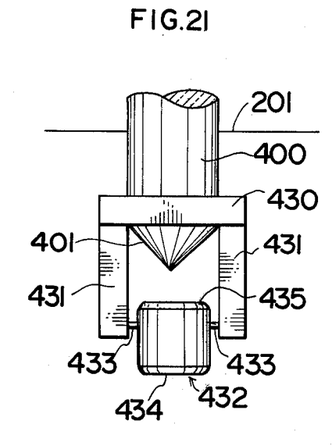
FIG. 21 is a front view connected with FIG. 19 and showing an indicating member 432 in sunken condition.

A second typical embodiment of the invention will now be described. FIG. 19 is a partly sectional front view showing the principal portion of an indicating device according to the second typical embodiment, and FIG. 20 is a side view of the same. Referring to FIGS. 19 and 20, a fixing member 430 is fixed near the lower end of a bar-like body 400 and a cylindrical indicating member 432 serving as indicating means is rotatably mounted in a pair of bearings 431, 431 downwardly extending from said fixing member 430. The rotative shaft 433 of the indicating member 432 extends away from the center of gravity (or the center of buoyancy) of the indicating member 433. The specific gravity of the indicating member 432 is selected such that it is correlated with the specific gravity of the electrolyte. The rotation of the indicating member 432 is controlled by sinking and floating thereof, and FIGS. 19 and 20 show the floating condition of the indicating member 432. In this condition, the surface 432 of the indicating member 432 faces upward. The sunken condition of the indicating member 432 is shown in FIG. 21 to be later described. In this condition, the surface 435 of the indicating member 432 faces upward.

FIG. 21 shows a condition in which the indicating member 432 is sunken. If the specific gravity of the indicating member 432 is, for example, 1.20, then the indicating member is rotated to assume the condition shown in FIG. 21 when the specific gravity of the electrolyte becomes less than 1.20. Therefore, it will be understood that if the surface 434 is colored blue and the surface 435 red, the blue color is indicated (for example, FIG. 19) through the bar-like body 400 when the specific gravity of the electrolyte is greater than 1.20 (when it is proper) and the red color is indicated (FIG. 21) through the bar-like body 400 when the specific gravity of the electrolyte is less than 1.20 (when it is improper).

Further, if the specific gravity of the indicating member 432 is set at, for example, 1.28 and the surface 434 is colored red and the surface 435 blue, then the blue color is indicated (FIG. 21) through the bar-like body 400 when the specific gravity of the electrolyte is less than 1.28 (when it is proper or when charging has to be continued) and the red color is indicated (for example, FIG. 19) through the bar-like body 400 when the specific gravity of the electrolyte is greater than 1.28 (when charging has been completed).

Figure 22:
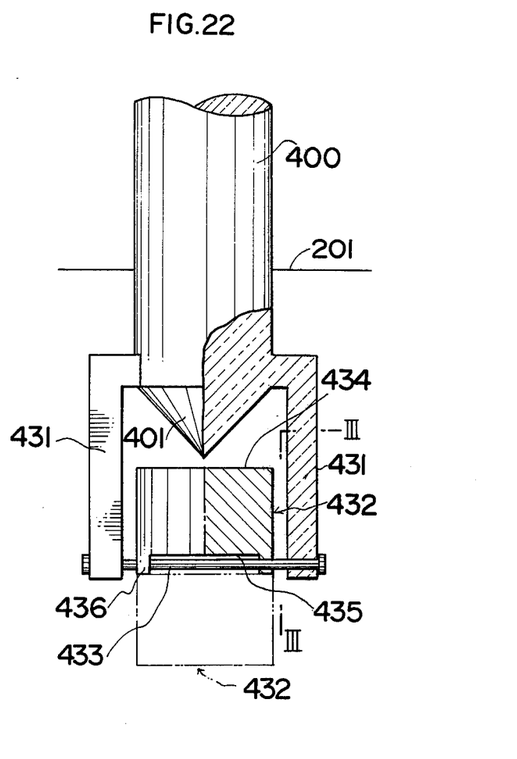
FIG. 22 is a front view in partial section taken along the line II—II of FIG. 23.
Figure 23:
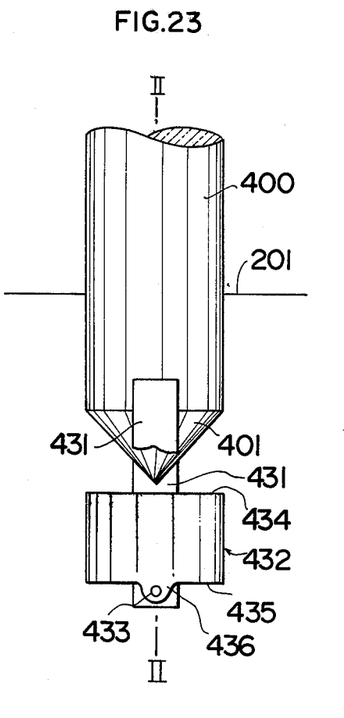
FIG. 23 is a side view partly broken away along the line III—III of FIG. 22.
Figure 24:
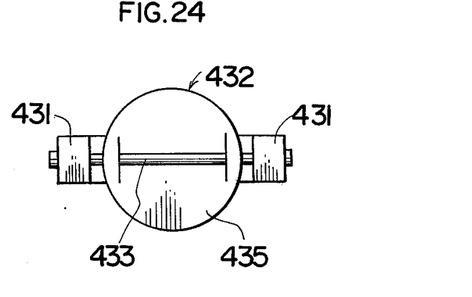
FIG. 24 is a bottom view.

FIGS. 22 through 24 show a modification of the second typical embodiment, wherein only the lower end portion of a bar-like body 400 is shown. FIG. 22 is a front view partly in section taken along the line II—II of FIG. 23; FIG. 23 is a side view partly broken away along the line III—III of FIG. 22; and FIG. 24 is a bottom view. Here, the parts which are the same as or similar to those shown in FIGS. 19 and 20 are given the same reference numerals as used in FIGS. 19 and 20. Referring to FIGS. 22 through 24, the rotative shaft 433 of the indicating member 432 is provided along a certain surface of the indicating member 432. In this embodiment also, differently colored surfaces 434 and 435 are provided and said rotative shaft 433 is provided along, for example, the surface 435 and extends through bearings 436 projecting from the surface 435. In addition, the bearings 431, 431 for pivotally supporting the rotative shaft 433 may be integral with the bar-like body 400, as shown in FIG. 22. The condition shown in FIGS. 22 through 24 is one in which the indicating member 432 is floating, and the condition in which it is sunken is shown in phaantom lines in FIG. 22 alone.

According to the embodiment described above, the center of buoyancy is more deviated from the rotative shaft 433 than in the case of the embodiment shown in FIG. 19. As a result, a greater moment is obtained so that even if the indicating member 432 is small in size, it is able to sink and float, or it is rotatable, with higher sensitivity. In addition, it is preferable that the rotative shaft 433 be given the same color as the surface 435.

Figures 25, 26, 27, 28, 29:
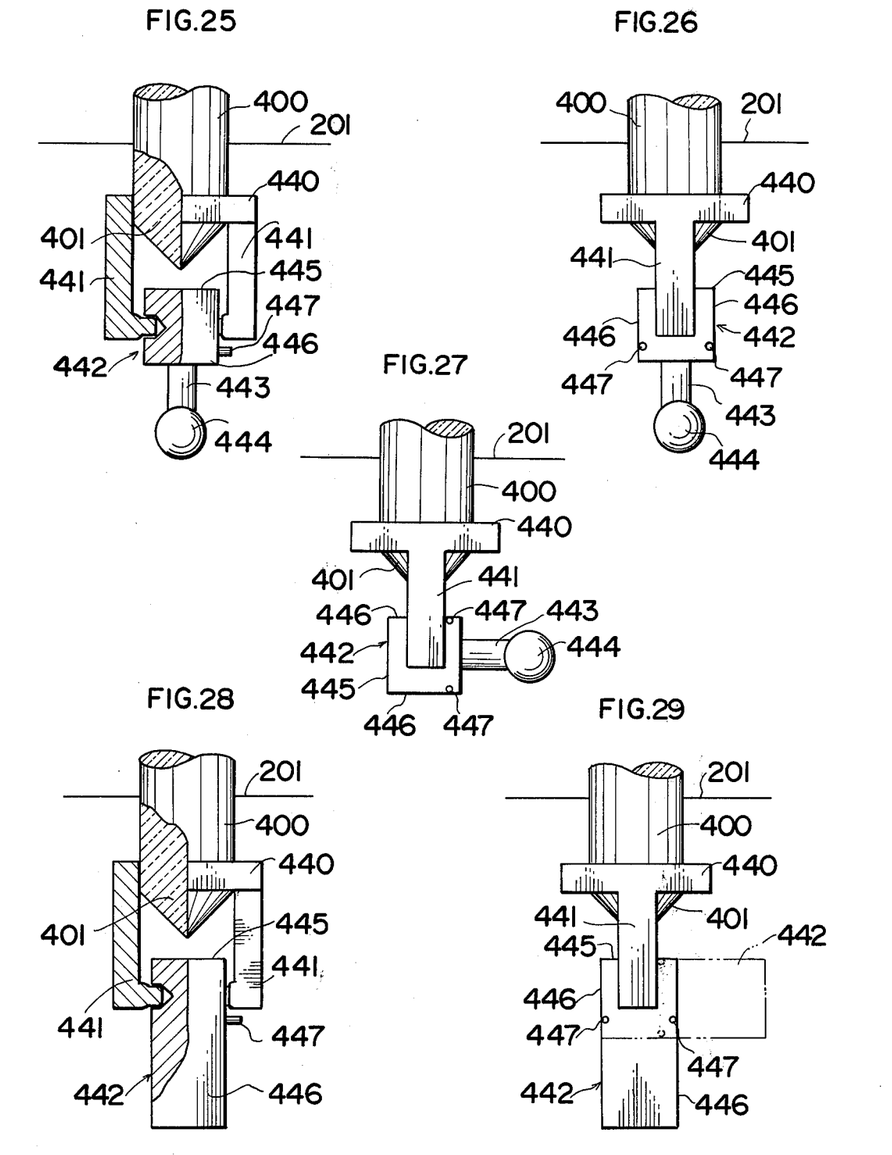
FIG. 25 is a partly sectional front view showing another modification of the second typical embodiment.
FIG. 26 is a side view of the same.
FIG. 27 is a side view connected with FIG. 26 and showing a float 444 in a floating condition.
FIG. 28 is a partly sectional front view showing the principal portion of an embodiment similar to that shown in FIGS. 25 through 27.
FIG. 29 is a side view of the same.

The second typical embodiment which is being described has other modifications. FIG. 25 is a partly sectional front view showing only the principal portion of such modification, and FIG. 25 is a side view of the same. Referring to FIGS. 25 and 26, a fixing member 440 is fixed near the lower end portion of a bar-like body 400 an an indicating member 442 supported by a pair of bearings 441, 441 downwardly extending from the fixing member 440 is rotatable through a predetermined angle. A float 444 is fixed to the indicating member 442 through a suitable arm 443. The specific gravity of the indicating member 442 including the float 444 is selected such that it is correlated with the specific gravity of the electrolyte. The rotation of the indicating member 442 is controlled by the sinking and floating of the float 444, and the condition shown in FIGS. 25 and 26 is one in which the float 444 is sunken. In this condition, the surface 445 of the indicating member 442 faces upward. The condition in which the float 444 is floating is shown in FIG. 27, when one of the surfaces 446 of the indicating member 442 which are at right angles with the surface 445 faces upward. In order to define the condition shown in FIG. 27 as a terminal position of rotation of the indicating member 442, the indicating member 442 is provided with projections 447, 447 which limit the rotative range thereof. The projections 447 abut against the bearings 441 to limit the rotative range. In addition, it is preferable that two such projections 447 be symmetrically provided as shown in FIG. 26, so as to enable the rotative range to be limited regardless of the direction of rotation of the indicating member 442.

FIG. 27 shows the above described floating condition of the float 444. For simplification of the following description, suppose that the center of gravity of the indicating member 442 is located on the rotative shaft of the indicating member 442 and that the arm 443 and float 444 have the same specific gravity. On this supposition, if the specific gravity of the indicating member 442 including the float 444 is 1.20, then the condition shown in FIG. 27 is established when the specific gravity of the electrolyte becomes greater than 1.20. The rotation of the indicating member 442 is stopped when the projection 447 abuts against the associated bearing 441. At this time, the associated surface 446 faced upward, as described above. If therefore, the surface 445 is colored red and the surface 446 blue, then the blue color is indicated (FIG. 27) through the bar-like body 400 when the specific gravity of the electrolyte is greater than 1.20 (when it is proper) and the red color is indicated (for example, FIG. 26) through the bar-like body 400 when the specific gravity of the electrolyte is less than 1.20 (when it is improper).

Further, if the specific gravity of the indicating member including the float 422 is set at, for example, 1.28 and the surface 445 is colored blue and the surface 446 red, then the blue color is indicated (for example, FIG. 26) through the bar-like body 400 when the specific gravity of the electrolyte is less than 1.28 (when it is proper or when charging has to be continued) and the red color is indicated (FIG. 27) through the bar-like body 400 when the specific gravity of the electrolyte is greater than 1.28 (when charging has been completed).

FIG. 28 shows an embodiment of the invention similar to the one shown in FIG. 25 and is a partly sectional front view showing only the lower end portion of a bar-like body 400, and FIG. 29 is a side view of the same. The parts which are the same as or similar to those shown in FIG. 25 are given the same reference numerals as used in FIG. 25. In this embodiment, the indicating member 442 is given the same function as that of the float 444 used in the above-described embodiment. More particularly, the rotative shaft of the indicating member 442 is deviated from the center of gravity of the indicating member 442, and the specific gravity of the indicating member 442 is selected such that it is correlated with the specific gravity of the electrolyte. Therefore, when the specific gravity of the indicating member 442 becomes less than that of the electrolyte, the indicating member 442 floats as shown in phantom lines in FIG. 29 with the uppermost surface changing from the surface 445 to the surface 446. The rest of the arrangement is the same as in the preceding embodiment and the same merits are obtained, a description thereof being omitted. According to this embodiment, however, it is to be noted that since elements such as the arm 443 and float 444 are not required, the arrangement is simplified and hence the assembling operation is also simplified.

As described above, the second typical embodiment includes a rotatable indicating member 432 (442 serving as indicating means disposed in the field of vision through a bar-like member 400 serving as seeing-through means. The indicating member has its center of buoyancy located at a position different from the position of the rotative shaft, for example, by eccentrically placing the rotative shaft. If, therefore, the specific gravity of the indicating member is selected such that the indicating member can be rotated in the electrolyte according to changes in the specific gravity of the electrolyte, then the indicating member is rotated according to changes in the specific gravity of the electrolyte. If the manner of indication for the upwardly facing surface is changed according to the rotation of the indicating member, then the manner of indication of the indicating member surface to be seen through the bar-like body is changed, making it possible to indicate the condition of specific gravity of the electrolyte.

It is clear that the above-described second typical embodiment is different from the previously-described first typical embodiment in that even if a plurality of indicating members or their equivalents are provided on different levels, the condition of specific gravity of the electrolyte cannot be stepwise indicated. However, it is desired to provide an indicating device which is capable of stepwise indicating the condition of specific gravity of the electrolyte by applying the second typical embodiment. Such embodiments will now be described.

Figure 30:
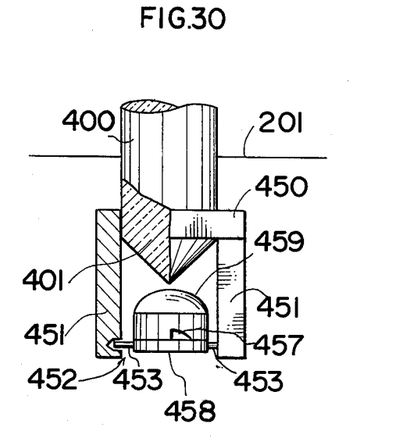
FIG. 30 is a partly sectional front view showing the principal portion of an embodiment of the invention employing the second typical embodiment so as to stepwise indicate the condition of specific gravity of the electrolyte.
Figure 31:
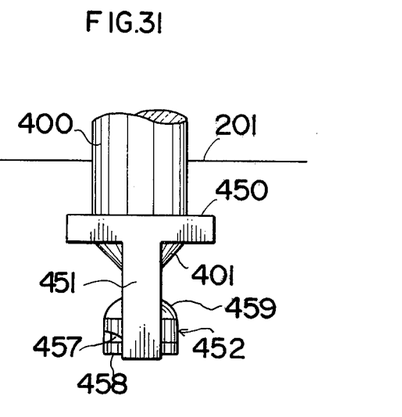
FIG. 31 is a side view of the same.

FIG. 30 is a partly sectional front view showing only the principal portion of an embodiment adapted to stepwise indicate the condition of specific gravity of the electrolyte by having the second typical embodiment applied thereto, and FIG. 31 is a side view of the same. Referring to FIGS. 30 and 31, a fixing member 450 is fixed near the lower end portion of a bar-like member 400, and an indicating member 452 supported by a pair of bearings 451, 451 downwardly extending from said fixing member is rotatable. The rotative shaft 453 of the indicating member 452 is deviated from the center of buoyancy of the indicating member 452. The specific gravity of the indicating member 452 is selected such that it is correlated with the specific gravity of the electrolyte. The rotation of the indicating member 452 is controlled by the sinking and floating of the indicating member 452, and the condition shown in FIGS. 30 and 31 is one in which it is floating. The arrangement of the indicating member 452 will be described below in more detail.

Figure 32:
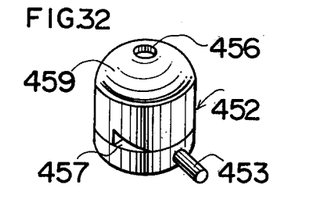
FIG. 32 is a perspective view showing only an indicating member 452 shown in FIG. 30.
Figure 33:
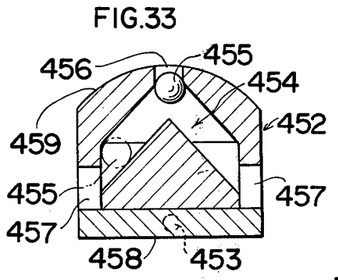
FIG. 33 is a central longitudinal section of the same.

FIG. 32 is a perspective view showing only the indicating member 452, and FIG. 33 is a longitudinal section of the same. The indicating member 452 has a space 454 defined therein in which a ball 455 is received. The upper wall defining the space 454 is provided with a through-hole 456 communicating with the outside, while the lower region of the peripheral wall is provided with a plurality of passageways 457 communicating with the outside. The presence of the through-hole 456 and passageways 457 allows the electrolyte to freely come in and out of the space 454 when the indicating member is placed in the electrolyte, so that the same condition as in the outside is established in the space 454. The size and shape of the through-hole 456 and passageways 457 are selected such as to prevent the ball 455 from slipping off. Further, the size and shape of the through-hole 456 are selected such that when the ball 455 comes just therebelow (or when the ball 455 floats, as shown in solid lines in FIG. 33), at least a portion of the ball 455 can be viewed from above the through-hole 456. The space 454 has a shape which would be defined between conical surfaces which are disposed parallel with each other. As a result, within the space 454, the ball 455 will be positioned just below the through-hole 456 (as shown in solid lines) in response to the floating thereof and will be positioned on the bottom of the space 454 (as shown in phantom lines) as it is shifted from the range in which it can be viewed from the outside, in response to the sinking thereof. This sinking and floating operation is smoothly carried out along the wall surface of the inclined space 454. The specific gravity of the ball 455 is selected such that it is correlated with the specific gravity of the electrolyte. The indicating member 452 having such construction is differently colored in order to have indicating ability; for example, the surface 458 is colored red, the surface 459 green and the ball 455 blue.

Figure 34:
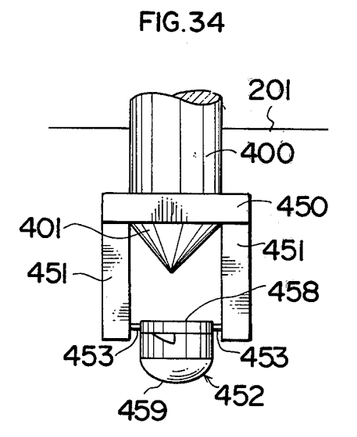
FIG. 34 is a front view connected with FIG. 30 and showing the indicating member 452 in a condition different from that shown in FIG. 30.
Figure 35:
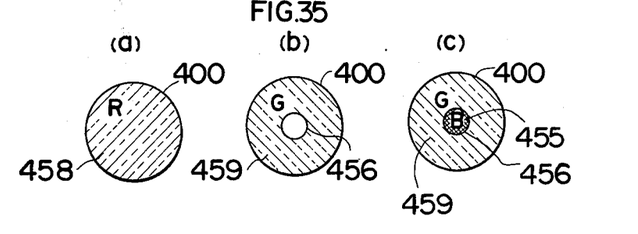
FIG. 35 is a view connected with FIGS. 30 through 34 and illustrating different manners of indication obtained according to changes in specific gravity, the view showing the upper end of a bar-like body 400 as seen from above the storage battery.

In the embodiment described above, for example, the specific gravity of the indicating member 452 is selected such that the indicating member will float in an electrolyte having a specific gravity of above 1.20 and the specific gravity of the ball 455 is selected such that the ball will sink in an electrolyte having a specific gravity of below 1.28. Further, the coloring of varous regions of the indicating member 452 is as described above. FIG. 34 shows the indicating member 452 in a condition different from the condition shown in FIG. 30. Further, FIG. 35 illustrates manners of indication which differ according to changes in specific gravity, and it shows the upper end surface of the bar-like body 400 as observed from above the storage battery. First, when the specific gravity of the electrolyte is within an allowable range, that is, between 1.20 and 1.28, the indicating member 452 will float to establish the condition shown in FIG. 30. On the other hand, the ball sinks. Therefore, the surface 459 can be viewed from the upper end surface of the bar-like body 400 but the ball 455 cannot be viewed through the through-hole 456, thus indicating the green color, as shown in FIG. 35, (b). Next, when the specific gravity is shifted from the allowable range to the lower side, that is, when it becmes less than 1.20, the indicating member 452 sinks to establish the condition shown in FIG. 34. Therefore, the surface 458 can be viewed from the upper end surface of the bar-like body 400 to indicate the red color, as shown in FIG. 35, (a). Finally, when the specific gravity is shifted from the allowable range to the higher side, that is, when it reaches the value 1.28 representing the last stage of charging, the indicating member 452 is in floating condition and the ball 455 floats. Therefore, as shown in FIG. 35, (c), this results in the indication of the green color on the surface 459, as well as in the indication of the blue color on the ball 455 covering the through-hole 456. As described above, when viewed from the upper end surface of the bar-like body 400, the condition of the electrolyte can be suitably perceived by the three typical manners of indication as shown in FIG. 35, (a), (b) and (c).

While the indicating device disclosed in the embodiment described above has been arranged so as to enable the float (ball 455) housed in the indicating member to be viewed in the floating condition of the indicating member, a reverse construction is possible which enables the float to be selectively viewed in the sunken condition of the indicating member.

Further constructions enabling the float to be selectively viewed in accordance with sinking and floating include the following.

Figure 36:
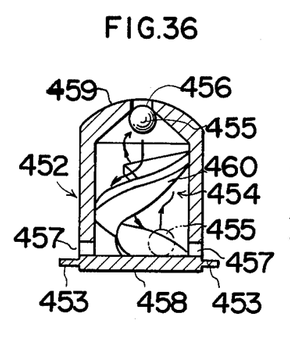
FIGS. 36 through 38 are views each showing the interior of another form of the indicating member 452.
Figure 37:
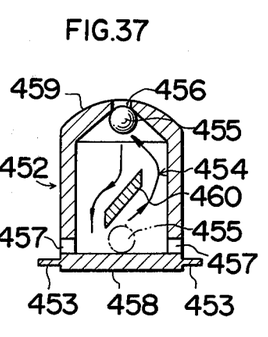
Figure 38:
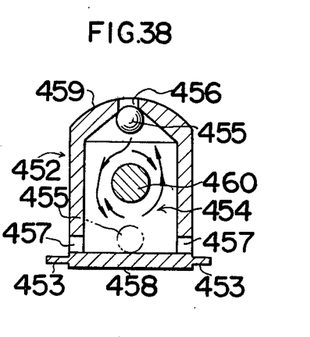

FIGS. 36 through 38 are views each showing the interior of another form of the indicating member 452. Here, the reference numerals used in FIG. 33 are given to the corresponding parts. FIGS. 36 through 38 illustrate a shield member 460 defining a non-linear passage way in order to put the ball 455 out of the field of vision when it is sunken. This shield member should have a shape which smoothly guides the ball 455 as the latter sinks and floats. In FIG. 36, as such shield member 460, there is formed a spiral wall surface providing a spiral passageway. In FIG. 37, the shield member 460 is in the form of an inclined plate-like body. In FIG. 38, the shield member 460 is in the form of a bar-like body of circular cross-section. With the individual shield members 460 thus constructed, the sinking and floating operation of the ball 455 is smoothly and reversibly controlled as the path of ball is shown by arrows. The ball 455 in sunken condition is hidden behind the shield member and hence it is put in a condition in which it cannot be viewed from the through-hole 456. The rest of the arrangement is substantially the same as in FIG. 33.

According to the embodiments described above with reference to FIGS. 30 through 38, the overdischarged condition of the storage battery (requiring charging) and the charging completion condition can be clearly indicated. Further, since the device is of compact construction, there is no danger of the device touching the electrode plates when it is inserted in the electrolytic vessel of the storage battery.

An embodiment having the second typical embodiment applied thereto so as to enable the condition of specific gravity of the electrolyte to be stepwise indicated will now be described.

Figure 39:
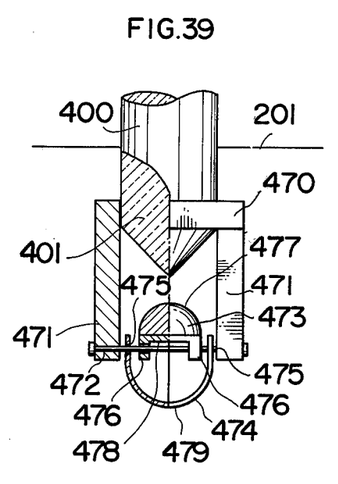
FIG. 39 is a partly sectional front view showing the principal portion of another embodiment of the invention applying the second typical embodiment so as to stepwise indicate the condition of specific gravity of the electrolyte.
Figure 40:
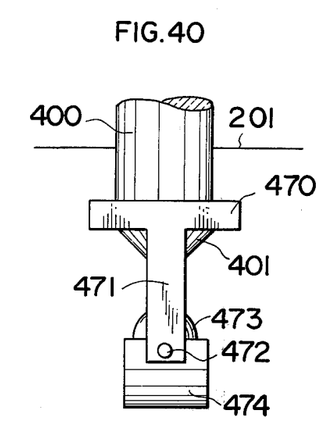
FIG. 40 is a side view of the same.

FIG. 39 is a partly sectional front view showing only the lower end portion of such embodiment, and FIG. 40 is a side of the same. Referring to FIGS. 39 and 40, a fixing member 470 is fixed near the lower end portion of a bar-like member 400, and a shaft 472 extends through the ends of bearings 471, 471 downwardly extending from said fixing member 470. Rotatably supported on this shaft 472 are a first hemispherical float 473 and a second U-shaped float 474. Bearings 475, 475 on the ends of the second float 474 are positioned outside bearings 476, 476 projecting from the flat surface of the first float 473 and are arranged on the shaft 472. The space necessary for rotation of the second float 474 is located outside the space necessary for rotation of the first float 473, and since these two spaces are independent of each other, the first and second floats 473 and 474 are rotatable independently of each other. The specific gravities of the floats 473 and 474 are selected such that they are correlated with the specific gravity of the electrolyte and that the specific gravity of the float 474 is greater than that of the float 473. The rotation of the floats 473 and 474 is controlled by the sinking and floating operation thereof, and the condition shown in FIGS. 39 and 40 is one in which the first float 473 is floating while the second float 474 is sunken. In addition, the floats 473 and 474 constructed in the manner described above are adapted to have the manner of indication of their uppermost surfaces (which are to be viewed through the bar-like body 400 and presented for indication) changed in a sinking and floating fashion so that the floats may have indicating ability. For example, different coloring is employed for changing the manner of indication; thus, the surfaces 477 and 478 of the float 473 are colored green and red, respectively, and the surface 479 of the float 474 is colored blue, and since the shaft 472 will be positioned above the surface 478 when the float 473 is sunken (FIG. 41), the shaft 473 is given a red color which is the same color as that of the surface 478.

Figure 41:
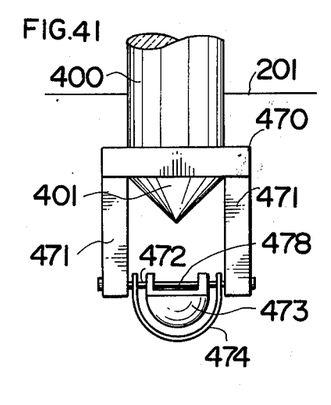
FIGS. 41 and 42 are front views connected with FIGS. 39 and showing the conditions of floats 473 and 474 providing indications different from that shown in FIG. 39.
Figure 42:
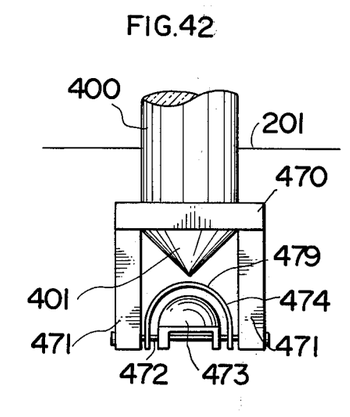

In the embodiment described above, the specific gravity of the first float 473 is selected such that, for example, said float will float in an electrolyte having a specific gravity of above 1.20 and the specific gravity of the second float 474 is selected such that said float will sink in an electrolyte having a specific gravity of below 1.28. Further, the manner of indication (or colored conditions) of the respective surfaces of the floats 473 and 474 are as described above. FIGS. 41 and 42 show the conditions of the floats 473 and 474 which provide indications different from that shown in FIG. 39.

First, when the specific gravity of the electrolyte is within the allowable range, that is, between 1.20 and 1.28 the first float 473 floats and the second float 474 sinks, thus establishing the condition shown in FIG. 39. In this condition, the surface 477 can be viewed from the upper end surface of the bar-like body 400. Next, when the specific gravity is shifted from the allowable range to the lower side, that is, when discharging has resulted in the specific gravity becoming less than 1.20, the float 473 also sinks to establish the condition shown in FIG. 41. In this condition, the surface 478 and shaft 472 can be viewed from the upper end surface of the bar-like body 400, so that the red color is indicated. Finally, when the gravity is shifted from the allowable range to the higher side, that is, when it reaches the value 1.28 at the end of charging, the float 474, in addition to the float 473, floats, thus establishing the condition shown in FIG. 42. In this condition, the surface 479 can be viewed from the upper end surface of the bar-like body 400, presenting the blue color. As described above, if viewed from the upper end surface of the bar-like body, the condition of the electrolyte can be suitably perceived by red, green and blue indications.

According to the embodiment described above with reference to FIGS. 39 through 42, in addition to the merits of the embodiments previously described with reference to FIGS. 30 through 38, there is obtained a merit that assembling operation is simple.

Preferred embodiments of the invention have been described so far, but the invention is not limited to such particular embodiments. For example, as for the transparent bar-like body having one end thereof immersed in the electrolyte to make it easier to view an object present in the electrolyte, although the invention relates exclusively to an indicating device for indicating the specific gravity (concentration) of electrolyte, the transparent bar-like body has the concomitant function of indicating the quantity of electrolyte. In the embodiments described above, the lower end of the bar-like body has been shown pointed, but in order to improve such quantity indicating function, the lower end may, of course, be a flat surface in the same manner as the upper end surface. Further, storage batteries to which the invention is applicable are not limited to the lead storage battery, and the invention may equally be applied to the alkaline storage battery by changing the specific gravity of the float.

It is therefore to be understood that the scope of the invention is to be limited solely by the appended claims.

What is claimed is:

1. An indicating device for a storage battery including an electrolytic vessel and an electrolyte contained therein, comprising, means for transmitting light therethrough adapted to extend from outside said electrolytic vessel toward the interior of said electrolyte contained in said electrolytic vessel of said storage battery for allowing visual observation therethrough of the interior of said electrolyte; and indicating means adapted to be disposed in said electrolyte in association with a range in which said indication means is visible through said light transmitting means;

said indicating means being rotatable around an axis which extends at right angles with respect to the extending direction of said light transmitting means;

the specifc gravity of said indicating means being correlated with the specific gravity of a battery electrolyte;

the center of buoyancy of said indicating means in said electrolyte being deviated from said axis of rotation, whereby said indicating means is rotated by the sinking and floating thereof caused in response to changes in the specific gravity of said electrolyte;

the manner of indication as viewed through said light transmitting means being changed in response to the rotation of said indicating means, thereby to indicate the condition of the specific gravity of said electrolyte.

2. An indicating device for a storage battery as set forth in claim 1, wherein said light transmitting means is a transparent member adapted to be mounted in at least a portion of the wall of said electrolytic vessel of said storage battery.

3. An indicating device for a storage battery as set forth in claim 2, wherein said transparent member is a bar-like body adapted to be mounted in the upper wall of said electrolytic vessel of said storage battery extending downward in the vertical direction; the upper end surface of said bar-like body being exposed to the upper wall of said electrolytic vessel while the lower end portion thereof is immersed in said electrolyte.

4. An indicating device for a storage battery as set forth in claim 3, wherein said lower end portion of said bar-like body is pointed.

5. An indicating device for a storage battery as set forth in claim 1, wherein the change of the manner of indication in response to the rotation of said indicating means as viewed through said light transmitting means is effected by the rotation of said indicating means which causes said indicating means selectively to come into and out of a range in which the same can be viewed through said light transmitting means.

6. An indicating device for a storage battery as set forth in claim 5, wherein said light emitting means is a transparent bar-like body adapted to be mounted in the upper wall of said electrolytic vessel of said storage battery, with the upper end surface thereof being exposed to the upper wall of said electrolytic vessel, the lower end portion being adapted to be immersed in said electrolyte;

said indicating means being substantially pivotally supported by said transparent bar-like body.

7. An indicating device for a storage battery as set forth in claim 6, wherein said indicating means comes into said visible range at one extremity position of its rotation caused in response to the sinking operation thereof and comes out of said visible range at the other extremity position of its rotation caused in response to the floating operation thereof.

8. An indicating device for a storage battery as set forth in claim 7, wherein said indicating means is U-shaped as a whole and pivotally supported at its opposite ends by the lateral side of said bar-like body and thereby suspended.

9. An indicating device for a storage battery as set forth in claim 8, which further comprises an additional member fixed in said visible range so as to be viewed in a manner different from that of said indicating means, said additional member being adapted to be positioned such that it can be viewed when said indicating means floats and is shifted from said visible range.

10. An indicating device for a storage battery as set forth in claim 9, wherein said different manner is realized by different coloring.

11. An indicating device for a storage battery as set forth in claim 8, which further comprises at least one other U-shaped indicating means disposed in said visible range in said electrolyte and overlapping said indicating means so as to be independently rotatable, said other indicating means being viewed in a manner different from that of said indicating means and having a specific gravity different from that of said indicating means.

12. An indicating device for a storage battery as set forth in claim 11, wherein said different manner is realized by different coloring.

13. An indicating device for a storage battery as set forth in claim 6, wherein said indicating means comes into said visible range at one extremity position of its rotation caused in response to the floating operation thereof and comes out of said visible range at the other extremity position of its rotation caused in response to the sinking operation thereof.

14. An indicating device for a storage battery as set forth in claim 13, wherein the rotative shaft of said indicating means is positioned below and outwardly of the circumference of the lower end portion of said bar-like body.

15. An indicating device for a storage battery as set forth in claim 14, which further comprises a member fixedly installed in said visible range so as to be viewed in a manner different from that of said indicating means, said member being positioned such that it can be viewed when said indicating means sinks and is shifted from said visible range.

16. An indicating device for a storage battery as set forth in claim 15, wherein said different manner is realized by different coloring.

17. An indicating device for a storage battery as set forth in claim 14, wherein at least one other independently rotatable indicating means is provided in said visible range in said electrolyte to overlap said indicating means, said other indicating means being viewed in a manner different from that of said indicating means and having a specific gravity different from that of said indicating means.

18. An indicating device for a storage battery as set forth in claim 17, wherein said different manner is realized by different coloring.

19. An indicating device for a storage battery as set forth in claim 1, wherein the change of the manner of indication in response to the rotation of said indicating means as viewed through said light transmitting means is achieved such that the manners of indication of the surfaces which face toward said light transmitting means at the opposite extremity positions of the rotation of said indicating means caused by the floating and sinking operation thereof are mutually changed, whereby the surface having said mutually changed manner of indication is viewed through said light transmitting means.

20. An indicating device for a storage battery as set forth in claim 19, wherein said change of the manner of indication is realized by different coloring.

21. An indicating device for a storage battery as set forth in claim 19, wherein light transmitting means is a transparent bar-like body mounted in the upper wall of said electrolytic vessel of said storage battery, with the upper end surface thereof being exposed to the upper wall of said electrolytic vessel, the lower end portion being adapted to be immersed in said electrolyte;
said indicating means being substantially pivotally supported by said transparent bar-like body.

22. An indicating device for a storage battery as set forth in claim 21, wherein said indicating means is adapted to be installed so that it can be reversibly rotated in a range in which it can be viewed through said bar-like body.

23. An indicating device for a storage battery as set forth in claim 21, wherein said indicating means is reversibly rotatable in a range in which it can be viewed through said bar-like body, and one extremity position of rotation caused by the floating operation thereof and the other extremity position of rotation caused by the sinking operation thereof are realized when it is rotated through substantially a right angle in either direction.

24. An indicating device for a storage battery as set forth in claim 23, wherein a member relatively different in specific gravity from said indicating means is fixed to said indicating means in order to locate the center of buoyancy of said indicating means at a position deviated from the rotative axis of said indicating means.

25. An indicating device for a storage battery as set forth in claim 22, which further comprises a float different in specific gravity from said indicating means disposed within said indicating means, a space being formed which defines a range in which said float sinks and floats, said space communicating with the outside of said indicating means where said electrolyte exists;
the surface of said indicating means which will face upward when said indicting means is floating being provided with a through-hole which enables at least a portion of said float to be viewed from the outside when said float is floating;
the shape of said space being selected such that when said float is sunken it cannot be viewed through said through-hole, whereby when the surface provided with said through-hole faces upward said float can be selectively viewed through said bar-like body and said through-hole in response to the sinking and floating thereof;
whereby the condition of the specific gravity of the electrolyte can be indicated in three steps.

26. An indicating device for a storage battery as set forth in claim 25, wherein the surface of said indicating means which faces upward when it is floating, the surface of said indicating means which faces downward when it is sunken, and the surface of said float which is viewed through said through-hole are differently colored.

27. An indicating device for a storage battery as set forth in claim 25, whherein said space is defined by a conically inclined wall surface, and said through-hole is located on top of said cone.

28. An indicating device for a storage battery as set forth in claim 25, wherein the three steps of the condition of the specific gravity of the electrolyte to be indicated are allowed to the charging requiring condition, the safely dischargeable condition, and the charging completion condition.

29. An indicating device for a storage battery as set forth in claim 22, which further comprises second indicating means disposed in a space outside the space in which said indicating means is rotated;

said second indicating means having its axis of rotation aligned with that of said first indicating means, the center of buoyancy thereof being located at a position which is not on said axis of rottion, the specific gravity thereof being relatively greater than that of said first indicating means;

the surface of said first indicating means which faces upward when it is sunken being given a first manner of indication, the surface of said first indicating means which is opposed to the first mentioned surface facing upward in the sunken condition and which faces upward when said first indicating means is floating being given a second manner of indication, and the surface of said second indicating means which faces upward when it is floating being given a third manner of indication, whereby;

the manners of indication of the surfaces which can be viewed through said bar-like body are successively changed according as the specific gravity of the electrolyte changes from smaller to larger values, thus presenting said first, second and third manners in the order mentioned;

the condition of the specific gravity of the electrolyte being indicated in three steps.

30. An indicating device for a storage battery as set forth in claim 29, wherein said first, second and third manners of indication are realized by different coloring.

31. An indicating device for a storage battery as set forth in claim 29, wherein said second indicating means is U-shaped and placed to externally hold said first indicating means.

32. An indicating device for a storage battery as set forth in claim 29, wherein the three steps of the condition of the specific gravity of the electrolyte to be indicated are allotted to the charging requiring condition, the safely dischargeable condition, and the charging completion condition.

33. An indicating device for a storage battery as set forth in claim 1, wherein the storage battery is a lead storage battery.

34. An indicating device for a storage battery as set forth in claim 1, wherein the specific gravity of said indicating means is selected such that the sinking and floating operation of said indicating means takes place at the boundary between a condition in which the specific gravity of said electrolyte requires charging and a condition in which the storage battery can be safely discharged.

35. An indicating device for a storage battery as set forth in claim 1, wherein the specific gravity of said indicating means is selected such that the floating operation of said indicating means takes place when the specific gravity condition of the electrolyte corresponds to the completion of charging.

* * * * *

UNITED STATES PATENT OFFICE
CERTIFICATE OF CORRECTION

Patent No. 4,074,025                    Dated February 14, 1978

Inventor(s) Shiro Miyagawa

It is certified that error appears in the above-identified patent and that said Letters Patent are hereby corrected as shown below:

In the cover sheet Item [75] the inventor's address should read --Suita-shi, Osaka-fu, Japan--.

In the cover sheet Item [30] the seventh priority date and number should read --Jan. 6, 1977 Japan ....52-902--.

In the cover sheet Item [57] after the "Abstract" "35 Claims, 42 Drawing Figures" should read -- --35 Claims, 45 Drawing Figures--.

Column 16, line 12, "indication" should be --indicating--.

Column 18, line 47, "indicting" should be --indicating--.

Column 18, line 68, "whherein" should be --wherein--.

Column 19, line 16, "rottion" should be --rotation--.

Signed and Sealed this

Twenty-seventh Day of June 1978

[SEAL]

*Attest:*

RUTH C. MASON
*Attesting Officer*

DONALD W. BANNER
*Commissioner of Patents and Trademarks*